United States Patent Office 3,344,651
Patented Oct. 3, 1967

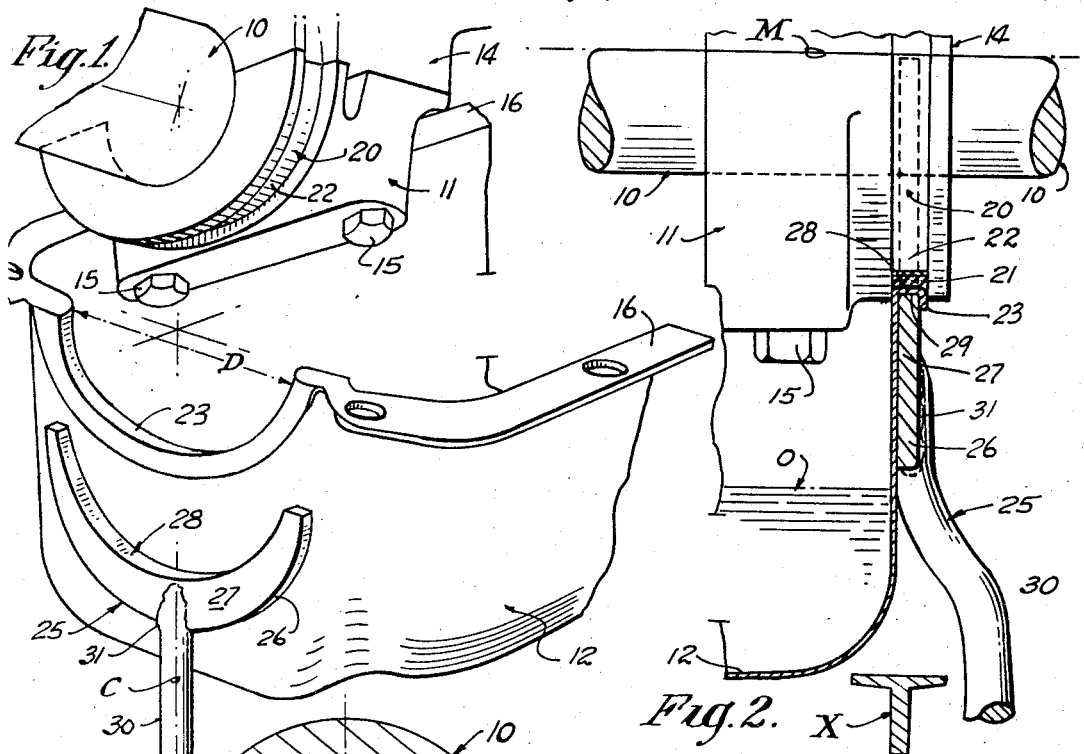
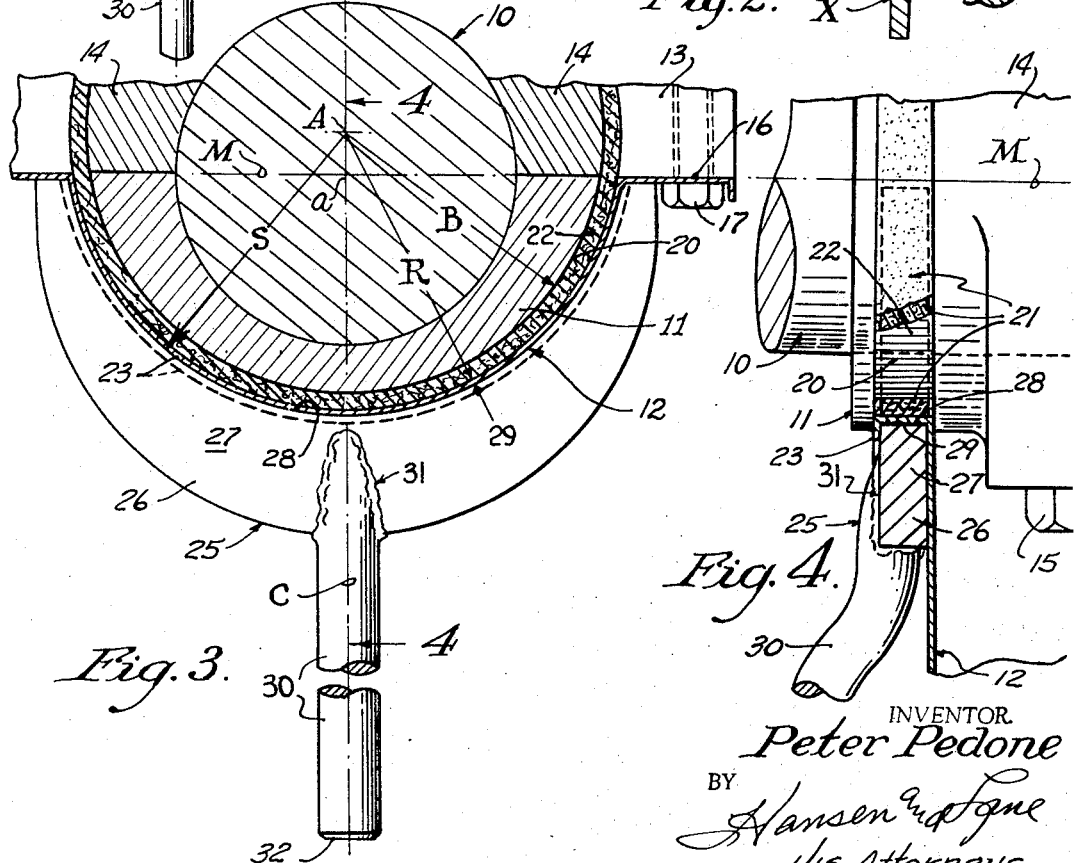

3,344,651
TOOL FOR REFORMING OIL SEAL RIM BEAD
Peter Pedone, 962 Moorpark, San Jose, Calif. 95126
Filed May 7, 1965, Ser. No. 453,922
5 Claims. (Cl. 72—479)

This invention relates to a seal setting die and more particularly to a tool for reforming the seal engaging rim of a crank case oil pan with the main bearing seal on the crank shaft of an automotive vehicle.

The crank case oil pan of automotive vehicles is usually pressed out of heavy gauge steel. Both ends have half circle rims beads formed to fit into an oil seal groove formed in the fore and aft main bearings. These rim beads are struck on a radius such that their curved contour lies parallel to but spaced from the circumference of the oil seal groove formed in the main bearing casting. A perfect fit requires uniform pressure of the rim bead against the oil seal. Any deviation, misalignment, distortion or dents in the rim bead causes a lessening of pressure between the rim and seal resulting in a leak of oil from the crank case. When such oil leaks occur it has heretofore been the practice to remove the entire oil pan, straighten out the rim bead or beads and replace the oil seal gasket. This procedure although costly from a standpoint of labor has not always proved satisfactory.

The present invention contemplates the provision of a tool by which to shape and fit the rim bead to the oil seal and seal groove while the oil pan is attached to the engine block.

It is another object of this invention to provide a seal rim forming die connected to a handle so situated as to receive a hammer blow for transmitting the force thereof to the die and thence the rim bead for shaping the latter to conform to the seal and seal groove, while they are in assembled relation on the vehicle.

It is yet another object to provide a hardened steel forming die shaped exactly to the radius of the outer periphery of the rim bead and having an arcuate contour parallel to that of the oil seal groove whereby to iron out any dents or misaligned defects in the rim bead when the die is struck with a hammer blow.

It is another object of this invention to provide such die with a centrally located handle so disposed as to equally distribute the force of a hammer blow from its end to the crescent shaped die whereby to force spread ends of the half circle rim bead into circumferential parallelism with the oil seal groove formed in the main bearing casting. In this connection it is a further object to provide the centrally located handle with a neck that is offset in the fore to aft plane of the crank shaft and crank case for circumventing any obstruction such as a cross brace of the vehicle frame or axles, springs or tie bars or the like, yet affording full effect of the hammer blow from the handle to the die.

These and other objects and advantages of the present invention will become apparent from a reading of the following description in the light of the accompanying drawing in which:

FIG. 1 is an exploded perspective view fragmentarily showing the main bearing and oil pan about to receive the tool of the present invention.

FIG. 2 is a longitudinal section through the assembly of FIG. 1.

FIG. 3 is a cross section through the main bearing and rim bead of the oil pan with the tool of the present invention in situs.

FIG. 4 is a section through FIG. 3 taken along line 4—4 thereof.

Referring to the drawings 10 indicates a crank shaft, 11 the lower half of a main bearing for the shaft 10 and 12 an oil pan all forming a part of an automotive engine. Two such main bearings 11 are provided, one at the fore end and the other at the aft end of the engine block 13 which is provided with integral upper halves of the main bearings one of which is indicated 14 on the drawings. The upper and lower halves 14 and 11 are joined at a meeting line M which traverses the axis $a$ of the crank shaft 10. The lower halves of the main bearings are secured to their respective upper halves 14 by means of bolts 15 to maintain the crank shaft 10 in place.

Between the main bearings the crank shaft 10 has the usual crank arms which dip into the crank case oil pan 12 and the latter and has flanges 16 secured by bolts 17 to the engine block 13 to confine oil O in the crank case. A suitable gasket between the flanges 16 and the engine block 13 prevents oil from leaking out.

The most vulnerable area subject to an oil leak is at the ends of the oil pan 12 where the latter embraces a portion of the lower halves 11 of the main bearings. For this reason each main bearing half 11 has a groove 20 formed therein for receiving an oil seal 21. The base surface 22 of the groove 20 is struck on a radius B from an axis A (FIG. 3). Each fore and aft end of the oil pan has a rim bead 23 formed thereon struck on a radius R from axis A to fit into the groove 20 so as to press tightly against the oil seal 21 when the bolts 17 are tightly threaded against the flanges 16 on the oil pan 12. It is therefore imperative that the rim bead 23 conform to substantial parallelism with the base surface 22 of the groove 20 to uniformly press the oil seal into leak tight engagement between the rim bead 23 and groove 20 in the main bearing halves 11. The oil pan 12 being stamped out of heavy gauge metal is quite vulnerable to distortion and/or denting. Very often, especially during repairs when the oil pan is removed, the rim beads 23 become distorted, dented or sprung out of round relative to the intended radius R thereof (FIG. 3). More over, the spread across the rim bead 23 at the meeting line M can often become greater or lesser than the intended diameter D at the plane of the upper flanges 16 of the pan 12. Such changes in the intended shape and form of the rim bead 23 result in an oil leak which is difficult to locate and identify. Even the provision of a new oil seal cannot successfully stop leaks caused by deformities in the rim bead 23. Removal of the oil pan and replacement of oil seals is costly, especially from the standpoint of labor.

In accordance with the present invention is it contemplated that the rim bead 23 be reformed while attached to the engine block 13. The present invention comprises a tool 25 (FIG. 3) having a head 26 provided with a hardened steel die 27 having an arcuate anvil surface 28 struck from the axis A on a radius S conforming to that of the outer surface 29 of a perfectly shaped rim bead 23. The main body of the die 27 is crescent shaped and has a handle or shank 30 welded as at 31 thereto at vertical center C extended from the axis A. The arrangement is such that the arcuate anvil surface 28 of the tool 25 can be placed against the surface 29 of the rim bead 23 while the oil pan 12 is in place. The shank of the handle 30 extends down beneath the engine 13 and has its tip 32 exposed to receive the blow of a hammer or mallet. In vehicles having cross bracing such as the one X illustrated in FIG. 2 located such as to obstruct alignment of the handle with the die 27 the handle 30 is offset as at 33 to circumvent such interfering structure. With the tool 25 in place the offsetting in the handle 30 is in a direction away from the oil pan 12 but in a vertical plane congruent to the fore to aft axis of the vehicle crank shaft 10.

The hardened steel die 27 is shaped to fit into the U shaped cross section of the rim bead 23 and the arc of the curved anvil surface 28 is such as to transmit the force effected by the hammer blow upon the handle to the under surface 29 of the rim bead 23. The hammer blow may be effected by attaching the handle 30 to an air hammer or by placing the hammer head of such instrument against the tip 32 of the handle 30. At all events the anvil surface 28 reforms and reshapes the rim bead 23 to conform substantially to true parallelism with the base surface 22 of the groove 20. Thus the oil seal 21 between the rim bead 23 and base 22 of the groove 20 is compressed uniformly throughout its length and a leak proof seal effected.

I have described the tool for reforming the oil seal rim of a crank case oil pan while the latter is in place on the engine. It is appreciated that variations in size and form of anvil arc and hammer blow receiving handle may be required for vehicles of different design and manufacture. The present invention may be susceptible to variations, alterations and/or modifications without departing from the spirit or scope of this invention. I therefore desire to avail myself of all variations, alterations and/or modifications as may fairly come within the purview of the appended claims.

What I claim as new and desire to protect by Letters Patent is:

1. A tool for reforming a rim bead oil seal on the oil pan of an automotive engine in situs in the oil seal groove of the crank shaft main bearing thereof comprising a hardened steel die having an arcuate anvil face struck on a radius comparable to that of the under surface of such rim bead, and a handle shank formed on said die centrally of the arcuate anvil surface and extending radially outward therefrom to receive a hammer blow for transmitting the force of the latter to said rim bead.

2. A tool for reinforcing the oil seal rim bead of an automotive engine oil pan in situs relative to the oil seal groove of the crank shaft main bearing thereof comprising a crescent shaped die having a hardened arcuate anvil face the radius of which is comparable to that of the under surface of such rim bead, and a handle shank formed on said die centrally of the arcuate anvil surface and extending radially outward from the center of said crescent shaped die and perpendicular to the diameter of said arcuate anvil face to receive a hammer blow for transmitting the force of the latter to said arcuate anvil face and thence to said rim bead.

3. A tool in accordance with that of claim 2 in which said handle shank is offset laterally from the plane of said crescent shaped die to circumvent interfering frame structure of the vehicle in which such automotive engine is mounted.

4. A device for reforming the oil seal rim bead of an oil pan while in situs in a circumferentially parallel oil seal groove formed in the crank shaft main bearing of an automotive engine comprising a tool having a head provided with a half circle anvil face the radius of which is comparable to that of the under surface of such rim bead, and a handle shank formed on said head centrally of said half circle anvil surface and extending radially outward therefrom perpendicular to the open end thereof to receive a hammer blow for transmitting the force of such blow to said rim bead to thereby reform the latter into substantial circumferential parallelism with respect to such oil seal groove.

5. The device in accordance with claim 4 in which said handle shank is offset relative to the half circle anvil face of said head to thereby facilitate placement and use of said tool despite obstructing structure on the vehicle in which such automotive engine is mounted.

References Cited
UNITED STATES PATENTS

| | | | |
|---|---|---|---|
| 1,264,610 | 4/1918 | Campbell | 72—497 |
| 1,914,257 | 6/1933 | Holmes | 29—275 |
| 2,176,626 | 10/1939 | Gentry | 29—275 |

CHARLES W. LANHAM, *Primary Examiner.*

G. P. CROSBY, *Assistant Examiner.*